United States Patent
Chen et al.

(10) Patent No.: US 11,397,529 B2
(45) Date of Patent: Jul. 26, 2022

(54) METHOD AND DEVICE FOR DETERMINING STRATEGY FOR DATA PLACEMENT WITHIN SSD

(71) Applicant: Samsung Electronics Co., Ltd., Suwon-si (KR)

(72) Inventors: Wenwen Chen, Suwon-si (KR); Wei Xia, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/952,855

(22) Filed: Nov. 19, 2020

(65) Prior Publication Data

US 2021/0200448 A1    Jul. 1, 2021

(30) Foreign Application Priority Data

Dec. 25, 2019    (CN) .......................... 201911355189.5

(51) Int. Cl.
*G06F 3/06* (2006.01)
*G06N 20/00* (2019.01)

(52) U.S. Cl.
CPC .......... *G06F 3/0616* (2013.01); *G06F 3/0611* (2013.01); *G06F 3/0644* (2013.01); *G06F 3/0659* (2013.01); *G06F 3/0679* (2013.01); *G06N 20/00* (2019.01)

(58) Field of Classification Search
CPC .... G06F 3/0616; G06F 3/0611; G06F 3/0644; G06F 3/0659; G06F 3/0679; G06N 20/00
See application file for complete search history.

(56) References Cited

U.S. PATENT DOCUMENTS

| | | | |
|---|---|---|---|
| 7,506,098 B2 | 3/2009 | Arcedera et al. | |
| 8,327,066 B2 | 12/2012 | Heo et al. | |
| 9,098,201 B2 | 8/2015 | Benjamin et al. | |
| 9,152,495 B2 | 10/2015 | Losh et al. | |
| 9,582,297 B2 | 2/2017 | Jin et al. | |
| 9,684,706 B2 | 6/2017 | Satzke et al. | |
| 9,851,919 B2 | 12/2017 | Golander et al. | |
| 10,127,234 B1 | 11/2018 | Krishnan et al. | |
| 10,254,979 B1 | 4/2019 | Watt | |
| 2008/0263259 A1* | 10/2008 | Sadovsky | G06F 3/0631 711/100 |
| 2014/0359197 A1 | 12/2014 | Franceschini et al. | |
| 2018/0349409 A1 | 12/2018 | Krishnan et al. | |

* cited by examiner

*Primary Examiner* — Kalpit Parikh
(74) *Attorney, Agent, or Firm* — Harness, Dickey & Pierce, P.L.C.

(57) ABSTRACT

A method and a device for determining a strategy for data placement within an SSD are provided. The method for determining a strategy for data placement within a Solid State Drive SSD, includes acquiring an optimization target and workload metric data that is pre-collected for a time period; selecting a machine learning model and a training data strategy according to the optimization target; selecting feature data from the workload metric data for the time period according to the selected training data strategy, and training the selected machine learning model based on the selected feature data; determining, in each subsequent predicting time, a strategy for data placement for a predicting time period corresponding to the predicting time according to the workload metric data for the time period and the workload metric data that is collected in the predicting time by using the trained machine learning model.

14 Claims, 5 Drawing Sheets

METHOD AND DEVICE FOR DETERMINING STRATEGY FOR DATA PLACEMENT WITHIN SSD

CROSS-REFERENCE TO RELATED APPLICATIONS

This U.S. non-provisional patent application claims priority under 35 U.S.C. § 119 to Chinese Patent Application No. 201911355189.5, filed on Dec. 25, 2019, in the Chinese Intellectual Property Office, the entire contents of which are hereby incorporated by reference.

TECHNICAL FIELD

The present disclosure relates to field of data storage techniques, and more particularly, to methods and devices for determining a strategy for data placement within a Solid State Drive (SSD).

DESCRIPTION OF RELATED ART

NAND flash memory-based SSD is widely used in scenarios, such as data centers, due to high performance and low power consumption compared to traditional magnetic disks. Since the NAND flash memory needs to be erased before it becomes writeable again, the update operation with respect to the data page is not supported. In order to solve this problem, SSD maintains one mapping table of logical addresses to physical addresses through an internal Flash Translation Layer (FTL) software.

The strategy for data placement within SSD is used to determine a position where data is to be placed. In order to improve the capacity and throughput of SSD, multiple channels are generally designed inside the SSD, and there are multiple chips in one channel. This multi-concurrent architecture brings new challenges to the design of data placement strategies in FTL software. There are two types of most common data placement strategies; the first type is a Round-Robin (RR) strategy, and the second type is a striping strategy.

The principle of the Round-Robin strategy is shown in FIG. 1. Each channel processes the user's write request in turn. The data of one write request will be put into one channel, and the data of the next write request will be put in the next channel. In the illustrated embodiment, pages P0 to P8 corresponding to a first input/output request are written in a channel 1, and pages P127 and P128 corresponding to a second input/output request are written in a channel 2 in turn.

The principle of the strip strategy is shown in FIG. 2. The strip strategy divides the user's write request data into a plurality of pages, and then writes these pages to multiple channels in parallel, thereby taking full advantage of the multi-channel concurrency. In the illustrated embodiment, pages P0 to P8 corresponding to the first input/output request are written in multiple channels, respectively, and pages P127 and P128 corresponding to the second input/output request are written in the channel 2 and channel 3, respectively.

In general, all data in one same write request have similar life cycles, and there is a high probability that they will be invalid at the same time. If the data of the same write request is written to the same block in the SSD, the number of valid pages that need to be moved out of the block is small in the subsequent Garbage Collection (GC), and the cost of GC is small, which is beneficial to reduce the write amplification factor (WAF) and the impact of GC on SSD performance fluctuations. Conversely, when the data of the same write request are striped to different channels, the subsequent GC cost will be increased.

The Round-Robin strategy can effectively reduce the subsequent GC cost of SSD and is friendly to write-intensive workloads. The Round-Robin strategy is unfriendly to read-intensive workloads, and there is a long read latency problem because the multi-channel concurrency features are not exploited.

The striping strategy is friendly to read-intensive workloads and leverages the multi-channel concurrency of SSD. The striping strategy is not friendly to write-intensive workloads because data with the same lifecycle are striped to multiple channels, and there is a problem of high subsequent GC cost.

Both of the above data placement strategies do not perceive workload changes and are designed for specific workloads. When the workload is changed from write-intensive to read-intensive or from read-intensive to write-intensive, no corresponding adjustments can be made, resulting in poor read latency or poor performance problem.

There are also some data placement strategies that perceive a part of the workload information. For example, they can count the access heat in the logical address range, store data with different heats in different physical blocks, thereby reducing the subsequent GC cost. This strategy only calculates the heat of data based on the current state of the workload. When the heat of the workload data changes drastically, the temperature of data in the future will be very different from the current temperature. For example, if a block of data is currently determined to be hot data and is placed in a hot block, the block of data may become cold, thereby increasing the cost for GC transportation in the hot block.

In summary, the current data placement strategies are either designed for a specific workload, which do not perceive the workload, or perceive a part of the workload (for example, can only determine the current data placement according to the current state of the workload), and when the workload changes drastically, the strategy for data placement cannot be dynamically adjusted, which ultimately leads to a large read latency problem or a poor performance problem.

SUMMARY

An example embodiment is to provide a method and device for determining a strategy for data placement within an SSD, so as to solve the problem of large read latency or poor read performance.

According to some example embodiments, there is provided a method for determining a strategy for data placement within an SSD. The method for determining the strategy for data placement within the SSD includes acquiring an optimization target and a first workload metric data that is pre-collected for a time period; selecting a machine learning model and a training data strategy according to the optimization target; selecting a feature data from the first workload metric data for the time period according to the selected training data strategy, and training the selected machine learning model based on the selected feature data; determining, in each subsequent predicting time, a strategy for data placement for a predicting time period corresponding to the predicting time according to the first workload metric data for the time period and a second workload metric data that is collected in the predicting time by using the trained machine learning model. This allows the SSD to optimize performance in a variety of workload environments, thereby implementing the dynamic determination of the strategy for data placement and improving the accuracy of the strategy for data placement.

According to some example embodiments, the determining the strategy for the data placement in the predicting time period corresponding to the predicting time according to the workload metric data for the time period and the workload metric data that is collected in the predicting time by using the trained machine learning model may include predicting an TO pattern according to the workload metric data for the time period and the workload metric data that is collected in current predicting time by using the trained machine learning model; determining the strategy for the data placement in the predicting time corresponding to the current predicting time according to the predicted IO pattern, thereby improving the accuracy of the strategy for data placement.

According to some example embodiments, a type of the IO pattern may include at least a read-intensive IO pattern, a write-intensive IO pattern, a data-hotness-degree IO pattern, a sequential-write IO pattern, and a random-write IO pattern.

According to some example embodiments, the determining the strategy for the data placement in the predicting time period corresponding to the current predicting time according to the predicted IO pattern may include determining to use a Round-Robin strategy as the strategy for the data placement, based on the predicted IO pattern being the read-intensive IO pattern; determining to use a strip strategy as the strategy for the data placement, based on the predicted IO pattern being the write-intensive IO pattern; determining to use a strategy that performs partition storage for hot and cold data, based on the predicted IO pattern being the data-hotness-degree IO pattern; adopting a strategy of writing data into a low cost flash memory unit, based on the predicted IO pattern being the sequential-write IO pattern; adopting a strategy of writing data into a high speed flash memory cell, based on the predicted IO pattern being the random-write IO pattern, thereby improving the accuracy of the strategy for data placement.

According to some example embodiments, the optimization target may include at least one of write performance, NAND flash life, or read latency.

According to some example embodiments, the selecting a machine learning model and a training data strategy according to the optimization target may include selecting the training data strategy for write performance optimization based on the optimization target being write performance, wherein, according to the training data strategy for write performance optimization. at least one of IO size, IO count, IO access interval, or write amplification factor is selected as the feature data for training from the first workload metric data; selecting the training data strategy for NAND flash life optimization based on the optimization target being the NAND flash life, wherein, according to the training data strategy for the NAND flash life optimization, at least the block erasure count is selected as the feature data for training from the first workload metric data; selecting the training data strategy for read latency optimization based on the optimization target being the read latency, wherein, according to the training data strategy for read latency optimization, at least one of IO size, IO count, or read latency is selected as the feature data for training from the workload metric data.

According to some example embodiments, the method may further include updating the time period and acquiring a third workload metric data for the updated time period, based on a change of optimization target being detected; re-selecting the machine learning model and the training data strategy according to the changed optimization target; re-selecting the feature data from the third workload metric data for the updated time period according to the re-selected training data strategy, to re-train the re-selected machine learning mode, so as to determine the strategy for the data placement by using the re-trained machine learning mode in each subsequent predicting time.

According to some example embodiments, the method may further include collecting the workload metric data in real time to obtain current workload metric data.

According to some example embodiments, there is provided a device for determining a strategy for data placement within an SSD. The device for determining a strategy for data placement within an SSD includes a processor configured to acquire an optimization target and a first workload metric data that is pre-collected for a time period; select a machine learning model and a training data strategy according to the optimization target; select a feature data from the first workload metric data for the time period according to the selected training data strategy, and training the selected machine learning model based on the selected feature data; and determine in each subsequent predicting time, a strategy for data placement for the predicting time period corresponding to the predicting time according to the first workload metric data for the time period and a second workload metric data that is collected in the predicting time by using the trained machine learning model.

According to some example embodiments, the processor may be configured to predict an IO pattern according to the first workload metric data for the time period and a third workload metric data that is collected in current predicting time by using the trained machine learning model; and determine the strategy for the data placement in the predicting time period corresponding to the current predicting time according to the predicted IO pattern, thereby improving the accuracy of the strategy for data placement.

According to some example embodiments, the type of the IO pattern may include at least a read-intensive IO pattern, a write-intensive IO pattern, a data-hotness-degree IO pattern, a sequential-write IO pattern, and a random-write IO pattern.

According to some example embodiments, the processor may be further configured to determine to use a Round-Robin strategy as the strategy for the data placement, based on the predicted IO pattern being the read-intensive IO pattern; determine to use a strip strategy as the strategy for the data placement, based on the predicted IO pattern being the write-intensive IO pattern; determine to use a strategy that performs partition storage for hot and cold data, based on the predicted IO pattern being the data-hotness-degree IO pattern; adopt a strategy of writing data into a low cost flash memory unit, based on the predicted IO pattern being the sequential-write IO pattern; adopt a strategy of writing data into a high speed flash memory cell, based on the predicted IO pattern being a random-write IO pattern, thereby improving the accuracy of the strategy for data placement.

According to some example embodiments, the optimization target may include at least one of write performance, NAND flash life, or read latency.

According to some example embodiments, the processor may be configured to select the training data strategy for write performance optimization based on the optimization target being write performance, wherein the training data strategy for the write performance optimization includes selecting at least one of IO size, IO count, IO access interval, or write amplification factor as the feature data for training from the first workload metric data; select the training data strategy for NAND flash life optimization based on the optimization target being the NAND flash life, wherein the training data strategy for NAND flash life optimization includes selecting at least the block erasure count as the feature data for training from the first workload metric data; select the training data strategy for read latency optimization based on the preset optimization target being read latency, wherein the training data strategy for read latency optimization includes selecting at least one of IO size, IO count, or read latency as the feature data for training from the first workload metric data.

According to some example embodiments, the processor may be further configured to update the time period and acquiring a third workload metric data for the updated time period, based on a change of the optimization target being detected; to select the machine learning model and the training data strategy according to the changed optimization target; and to re-select the feature data from the third workload metric data for the updated time period according to the re-selected training data strategy, to re-train the re-selected machine learning mode, so as to determine the strategy for the data placement by using the re-trained machine learning mode in each subsequent predicting time.

According to some example embodiments, the device may further include a data collecting unit, configured to collect the workload metric data in real time to obtain current workload metric data.

According to some example embodiments, there is provided a computer readable storage medium stored with a computer program, based on the computer program being executed by a processor, the method for determining a strategy for data placement within an SSD according to the present disclosure is implemented.

According to some example embodiments, there is provided a Solid State Drive (SSD), including a memory cell storing computer-readable instructions; and a processor including a processor configured to execute the computer-readable instructions to cause the processor to acquire an optimization target and a first workload metric data that is pre-collected for a time period; select a machine learning model and a training data strategy according to the optimization target; select feature data from the first workload metric data for the time period according to the selected training data strategy, and training the selected machine learning model based on the selected feature data; and determine, in a plurality of subsequent predicting time periods, a strategy for data placement for a one of the plurality of subsequent predicting time periods according to the first workload metric data for the time period and a second workload metric data that is collected in the one of the plurality of subsequent predicting time periods by using the trained machine learning model.

According to some example embodiments, there is provided a computing device, including a processor; a memory stored with a computer program, wherein when the computer program is executed by a processor, the method for determining a strategy for data placement within an SSD according to the present disclosure is implemented.

The method and device for determining a strategy for data placement within an SSD according to some example embodiments enables the SSD to optimize performance in a variety of workload environments by acquiring an optimization target and workload metric data that is pre-collected for a preset time period; selecting a machine learning model and a training data strategy according to the optimization target; selecting feature data from the workload metric data for the preset time period according to the selected training data strategy, and training the selected machine learning model based on the selected feature data; and determining, in each subsequent predicting time, a strategy for data placement for a predicting time period corresponding to the predicting time according to the workload metric data for the preset time period and the workload metric data that is collected in the predicting time by using the trained machine learning model, thereby implementing the dynamic determination of the strategy for data placement and improving the accuracy of the strategy for data placement.

Additional aspects and/or advantages of the present general inventive concept will be set forth in part in the description which follows, still a portion will be apparent from the description or may be known through the practice of the present general inventive concept.

BRIEF DESCRIPTION OF THE DRAWINGS

The above and other objects and features of the example embodiments of the present disclosure will become more apparent from the following description taken in conjunction with the accompanying drawings that exemplarily illustrates embodiments, in which.

DETAILED DESCRIPTION

Figure 1:
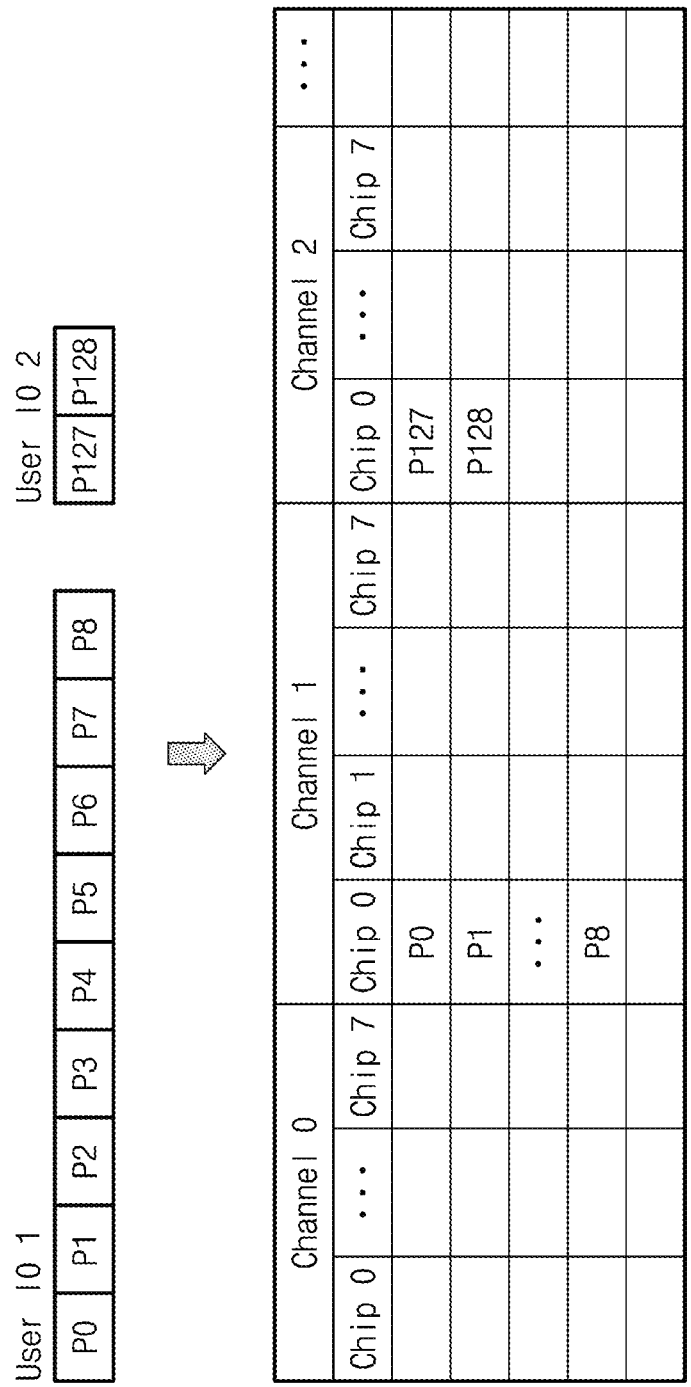
FIG. 1 illustrates a schematic diagram of the Round-Robin strategy theory.
Figure 2:
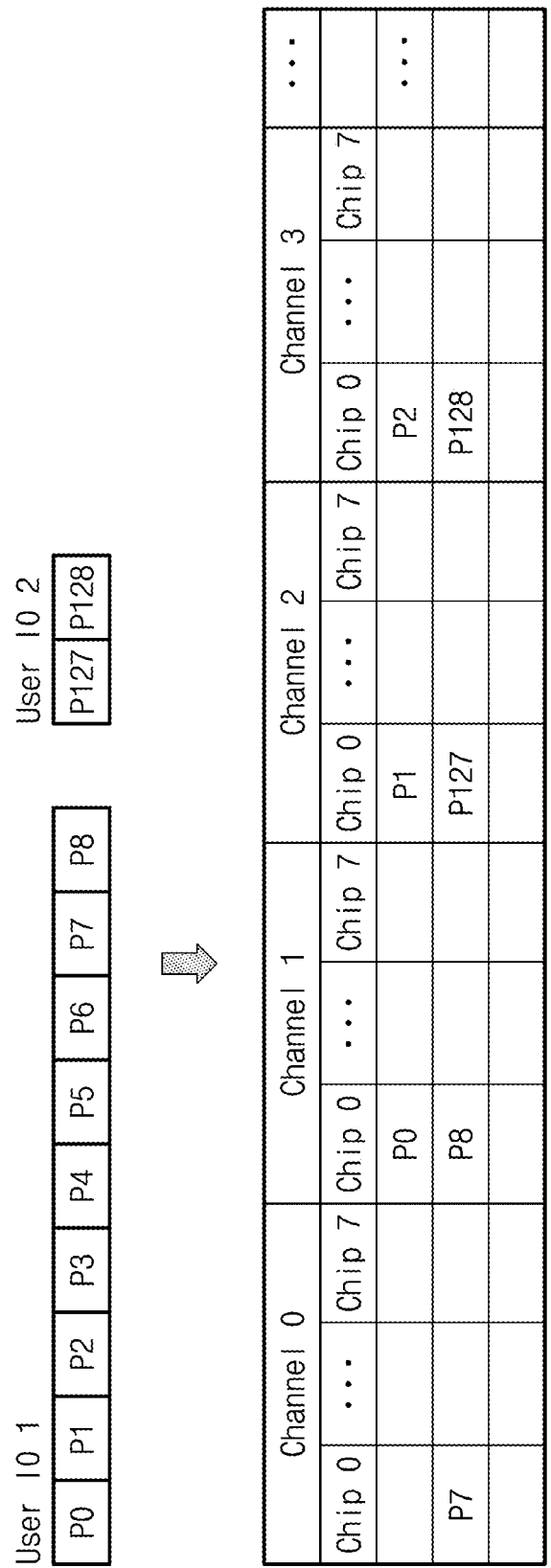
FIG. 2 illustrates a schematic diagram of the stripe strategy theory.

Reference will now be made in detail to example embodiments of the present disclosure, and examples of the embodiments are illustrated in the accompanying drawings, wherein same reference numerals refer to same parts throughout. The embodiments will be illustrated below, by referring to the accompanying drawings, so as to explain the present disclosure.

Figure 3:
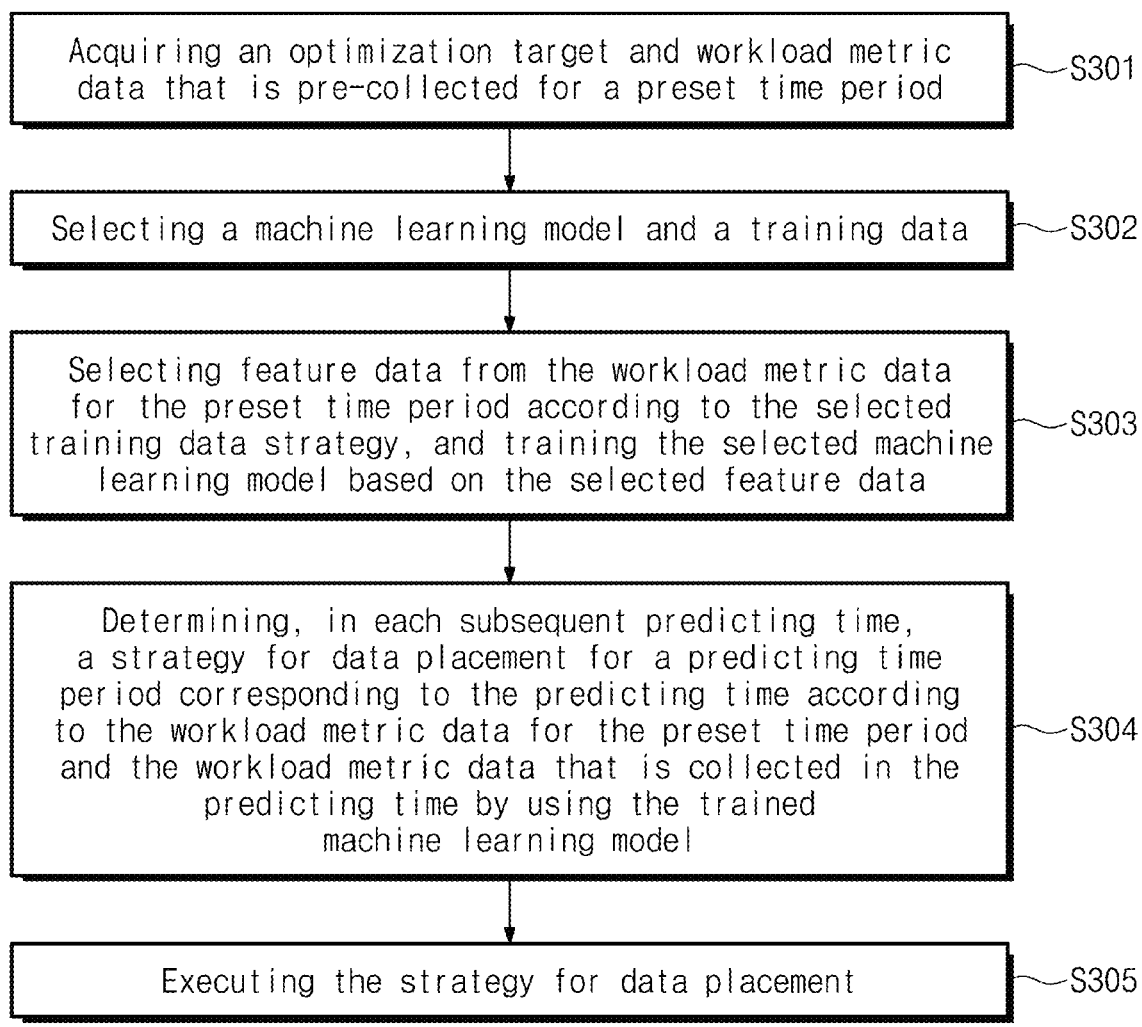
FIG. 3 illustrates a flowchart of a method for determining a strategy for data placement within an SSD, according to an example embodiment of the present disclosure.

FIG. 3 illustrates a flowchart of a method for determining a strategy for data placement within a Solid State Drive (SSD), according to an example embodiment of the present disclosure.

Referring to FIG. 3, in operation S301, an optimization target and workload metric data which is pre-collected for a preset time period are acquired.

In some example embodiments, users can set different optimization targets for the SSD according to different application scenarios. The application scenario may be, for example, writing-scene, reading-scene, and the like. The optimization target may be at least one of write performance, NAND flash life, read latency, and/or the like. It should be understood that the optimization target may also be other targets related to data placement, which is not limited in the present disclosure.

In some example embodiments, the workload metric data of the SSD may be collected in real time or periodically (for example, with a period of 1 s or 5 s, etc.).

Specifically, the workload metric data may include, but is not limited to, one or more of Input/Output (IO) size, IO count, read latency, write latency, write amplification factor (WAF), block erasure count, Input/Output Per Second (IOPS), IO access interval, and the like. Therefore, the IO size, IO count, read latency, write latency, write amplification factor, block erase count, and IOPS of the SSD, related to the workload of the SSD, may be collected in real time or periodically, to be used to dynamically determine the strategy for data placement within the SSD in real time or periodically, thereby optimizing the performance of the SSD.

In operation S302, a machine learning model and a training data strategy are selected according to the optimization target.

In some example embodiments, the selecting a machine learning model and a training data strategy according to the optimization target includes selecting a training data strategy for write performance optimization when the preset, or alternatively, desired, optimization target is write performance, wherein the training data strategy for write performance optimization comprises selecting at least one of IO size, IO count, IO access interval, and/or write amplification as feature data for training from the workload metric data; selecting a training data strategy for NAND flash life optimization when the preset, or alternatively, desired, optimization target is the NAND flash life, wherein the training data strategy for NAND flash life optimization comprises selecting at least the block erasure count as feature data for training from the workload metric data; selecting a training data strategy for read latency optimization when the preset, or alternatively, desired, optimization target is read latency, wherein the training data strategy for read latency optimization comprises selecting at least one of IO size, IO count, and/or read latency as feature data for training from the workload metric data. It should be understood that the training data strategy may also include a strategy for selecting training data for other optimization targets, which is not limited in this disclosure. That is, based on the optimization target, a training data strategy using selected feature data is determined for different optimization targets.

In some example embodiments, the machine learning model may be, but is not limited to, a regression algorithm model, a clustering algorithm model, a Long Short-Term Memory (LSTM) model, a Recurrent Neural Network (RNN) model, and the like. Alternatively or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide for example, at least one of various services and/or applications, e.g., an image classify service, an advanced driver assistance system (ADAS) service, or the like, and may be performed, executed, implemented, processed, or the like by some or all of any of the systems and/or devices described herein.

In operation S303, feature data is selected from the workload metric data for the preset, or alternatively, desired, time period according to the selected training data strategy, and the selected machine learning model is trained based on the selected feature data.

Specifically, when the preset, or alternatively, desired, optimization target is the write performance, at least one or more of IO size, an IO count, IO access interval, and/or write amplification factor may be selected as the feature data for training from the workload metric data according to the selected training data strategy; when the preset, or alternatively, desired, optimization target is the NAND flash life, at least the block erasure count may be selected as feature data for training from the workload metric data according to the selected training data strategy; when the preset, or alternatively, desired, optimization target is the read latency, at least one of IO size, IO count, and/or the read latency may be selected as the feature data for training from the workload metric data according to the selected training data strategy.

In some example embodiments, the selected machine learning model may be trained offline or online based on the selected feature data, which is not limited in the present disclosure.

In operation S304, in each subsequent predicting time, a strategy for data placement for a predicting time period corresponding to the predicting time is determined according to the workload metric data for the preset, or alternatively, desired, time period and the workload metric data that is collected in the predicting time by using the trained machine learning model.

Specifically, the workload metric data collected in real time or periodically may be input to the trained machine learning model to determine the strategy for data placement in real time or periodically, thereby implementing the dynamic adjustment of the strategy for data placement and improving the accuracy of the strategy for data placement.

In some example embodiments, in operation S305, the strategy for data placement may be executed. The execution may take the write data inputs during the time period or updated time period, and put the data of the write data inputs into channels as determined by the strategy for data placement. In some example embodiments, as flash translation layer (FTL) is executed by a memory controller in a memory device (e.g., a SSD), the operation S305 may be performed. In some example embodiments, writing data based on the strategy for data placement may increase performance of a memory device (e.g., a SSD) by improving write speeds or read speeds. In some example embodiments, the improvement will be based on the optimization targets.

In some example embodiments, in determining a strategy for data placement in the predicting time period corresponding to the predicting time according to the workload metric data for the preset, or alternatively, desired, time period and the workload metric data that is collected in the predicting time by using the trained machine learning model, an IO pattern may be predicted according to the workload metric data for the preset, or alternatively, desired, time period and the workload metric data that is collected in current predicting time by using the trained machine learning model first, and then a strategy for data placement in the predicting time period corresponding to the current predicting time is determined according to the predicted IO pattern.

In some example embodiments, the type of the IO pattern includes at least a read-intensive IO pattern, a write-intensive IO pattern, a data-hotness-degree IO pattern, a sequential-write IO pattern, and a random-write IO pattern.

In some example embodiments, in determining the strategy for data placement in the next time period according to the predicted IO pattern, a Round-Robin strategy is determined to be used as the strategy for data placement when the IO pattern is a read-intensive IO pattern; a strip strategy is determined to be used as the strategy for data placement when the IO pattern is a write-intensive IO pattern; a strategy that performs partition storage for hot and cold data is determined to be used when the IO pattern is the data-hotness-degree IO pattern. For example, hot data is placed on the same physical block and cold data is placed on another physical block. In addition, a strategy of writing data into a low cost flash memory unit is adopted, when the IO pattern is a sequential-write IO pattern. For example, data is written into a Multi-Level Cell (MLC). In addition, a strategy of writing data into a high speed flash memory cell is adopted, when the IO pattern is a random-write IO pattern. For example, data is written into a single-level cell (SLC).

In some example embodiments, when a change of optimization target is detected, the preset, or alternatively, desired, time period is updated and workload metric data for the updated preset, or alternatively, desired, time period is acquired, then, a machine learning model and a training data strategy are selected according to the changed optimization target, and feature data is selected from the workload metric data for the updated preset, or alternatively, desired, time period according to the re-selected training data strategy, to re-train the re-selected machine learning model, so as to determine a strategy for data placement by using the re-trained machine learning model in each subsequent predicting time. In other words, when a change of optimization target is detected, the methods are reevaluated and reconstructed in order to be adapted to the changed optimization target.

The method for determining the strategy for data placement within the SSD according to the example embodiments has been described above with reference to FIG. 3. Hereinafter, a device for determining a strategy for data placement within an SSD and units thereof according to the example embodiments will be described with reference to FIG. 4.

Figure 4:
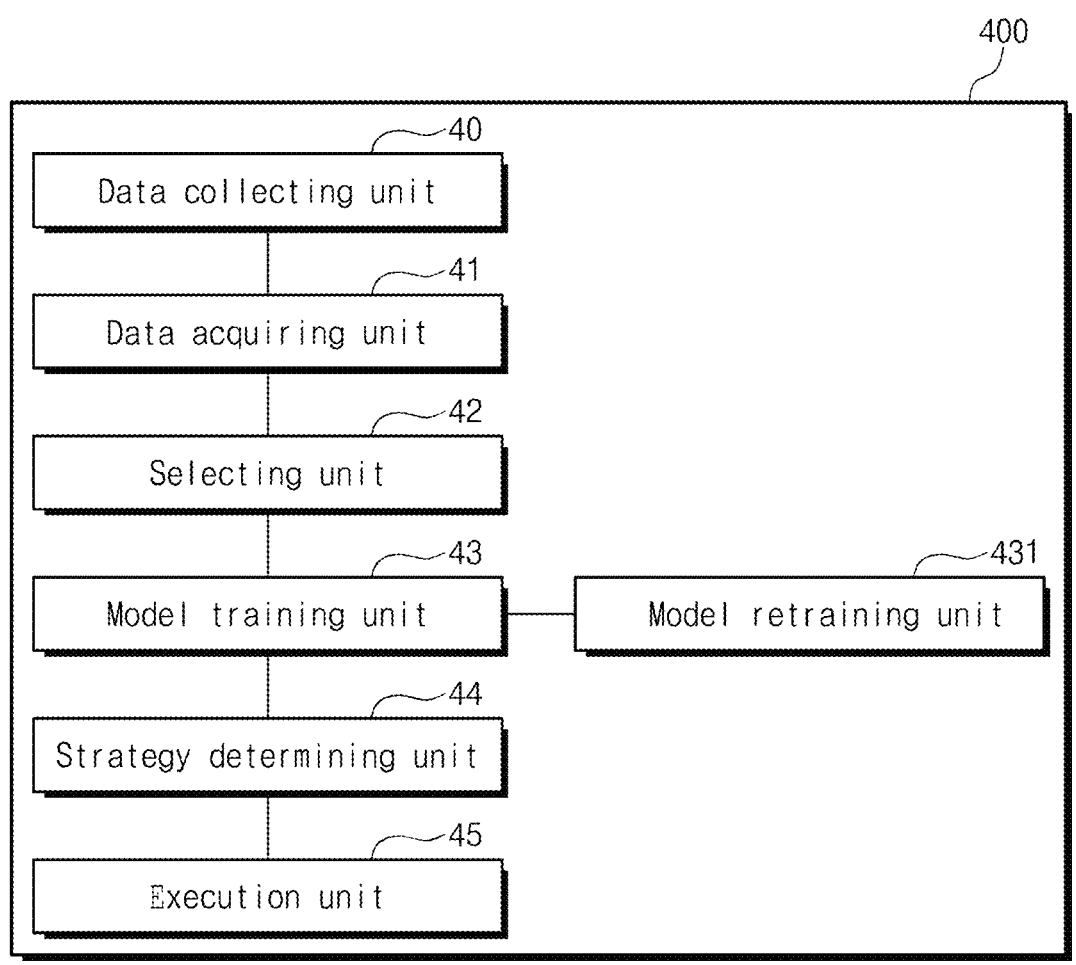
FIG. 4 illustrates a block diagram of a device for determining a strategy for data placement within an SSD, according to an example embodiment of the present disclosure.

FIG. 4 illustrates a block diagram of a device for determining a strategy for data placement within an SSD, according to an example embodiment. The device for determining the strategy for data placement within the SSD may be included in the SSD, or may be located in an electronic device connected with the SSD.

Referring to FIG. 4, the device for determining the strategy for data placement within the SSD may be a processor 400 which includes a data collecting unit 40, a data acquiring unit 41, a selecting unit 42, a model training unit 43, a retraining unit 431, and/or a strategy determining unit 44.

The data acquiring unit 41 is configured to acquire an optimization target and workload metric data that is pre-collected for a preset, or alternatively, desired, time period.

In some example embodiments, the optimization target may include at least one of write performance, NAND flash life, and/or read latency.

In some example embodiments, the device for determining the strategy for data placement within the SSD may further include a data collecting unit 40 configured to collect the workload metric data in real time to obtain current workload metric data.

The selecting unit 42 is configured to select a machine learning model and a training data strategy according to the optimization target.

In some example embodiments, the selecting unit 42 may be configured to select a training data strategy for write performance optimization when the preset, or alternatively, desired, optimization target is write performance, wherein the write performance optimization training data strategy comprises selecting at least one of IO size, IO count, IO access interval, and/or write amplification factor as feature data for training from the workload metric data; to select a training data strategy for NAND flash life optimization when the preset, or alternatively, desired, optimization target is the NAND flash life, wherein the training data strategy for NAND flash life optimization comprises selecting at least the block erasure count as feature data for training from the workload metric data; to select a training data strategy for read latency optimization when the preset, or alternatively, desired, optimization target is the read latency, wherein the training data strategy for read latency optimization comprises selecting at least one of IO size, IO count, and/or read latency as feature data for training from the workload metric data.

The model training unit 43 is configured to select feature data from the workload metric data for the preset, or alternatively, desired, time period according to the selected training data strategy, and to train the selected machine learning model based on the selected feature data.

The strategy determining unit 44 is configured to determine, in each subsequent predicting time, a strategy for data placement for the predicting time period corresponding to the predicting time according to the workload metric data for the preset, or alternatively, desired, time period and the workload metric data that is collected in the predicting time by using the trained machine learning model.

In some example embodiments, the strategy determining unit 44 may be configured to predict an IO pattern according to the workload metric data for the preset, or alternatively, desired, time period and the workload metric data that is collected in current predicting time by using the trained machine learning model; and to determine a strategy for data placement in the predicting time period corresponding to the current predicting time according to the predicted IO pattern.

In some example embodiments, the type of the IO pattern may include at least a read-intensive IO pattern, a write-intensive IO pattern, a data-hotness-degree IO pattern, a sequential-write IO pattern, and/or a random-write IO pattern.

In some example embodiments, the strategy determining unit 44 may be further configured to determine to use a Round-Robin strategy as the strategy for data placement, when the IO pattern is a read-intensive IO pattern; to determine to use a strip strategy as the strategy for data placement, when the IO pattern is a write-intensive IO pattern; to determine to use a strategy that performs partition storage for hot and cold data, when the IO pattern is the data-hotness-degree IO pattern; to adopt a strategy of writing data into a low-cost flash memory unit, when the IO pattern is a sequential-write IO pattern; to adopt a strategy of writing data into a high-speed flash memory cell, when the IO pattern is a random-write IO pattern, thereby improving the accuracy of the strategy for data placement.

In some example embodiments, the device for determining the strategy for data placement within the SSD may further include a re-training unit 431, configured to update the preset, or alternatively, desired, time period and to acquire workload metric data for the updated preset, or alternatively, desired, time period, when a change of optimization target is detected; to select a machine learning model and a training data strategy according to the changed optimization target; and to select feature data from the workload metric data for the updated preset, or alternatively, desired, time period according to the re-selected training data strategy, to re-train the re-selected machine learning model, so as to determine a strategy for data placement by using the re-trained machine learning model in each subsequent predicting time.

This allows the SSD to optimize performance in a variety of workload environments, thereby implementing the dynamic determination of the strategy for data placement and improving the accuracy of the strategy for data placement.

In some example embodiments, the device for determining the strategy for data placement within the SSD may further include an execution unit 45 configured to execute the determined strategy for data placement. The execution unit 45 may take the write data inputs during the time period or updated time period, and cause the SSD to put the data of the write data inputs into channels as determined by the strategy for data placement. In some example embodiments, the execution unit 45 may execute the flash translation layer to place the data of the write data inputs into the SSD based on the determined strategy for data placement. In some example embodiments, writing data based on the strategy for data placement may increase performance of the memory device (e.g., SSD) by improving write speeds or read speeds. In some example embodiments, the improvement will be based on the optimization targets.

In addition, according to some example embodiments, a computer readable storage medium stored with a computer program is provided, wherein when the computer program is executed by a processor, the method for determining a strategy for data placement within an SSD according to the present disclosure is implemented.

In some example embodiments, the computer readable storage medium can carry one or more programs that, when executed, the follow operations may be implemented; acquiring an optimization target and workload metric data that is pre-collected for a preset, or alternatively, desired, time period; selecting a machine learning model and a training data strategy according to the optimization target; selecting feature data from the workload metric data for the preset, or alternatively, desired, time period according to the selected training data strategy, and training the selected machine learning model based on the selected feature data; and determining, in each subsequent predicting time, a strategy for data placement for a predicting time period corresponding to the predicting time according to the workload metric data for the preset, or alternatively, desired, time period and the workload metric data that is collected in the predicting time by using the trained machine learning model.

The computer readable storage medium may be, for example, but not limited to, an electronic, magnetic, optical, electromagnetic, infrared, or semiconductor system, device, or, equipment or any combination of the above. More specific examples of computer readable storage media may include, but not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above mentioned. In the example embodiments, a computer readable storage medium may be any tangible medium that can contain or store a computer program using transitory or non-transitory memory, which can be used by or in connection with an instruction execution system, device, or, equipment. The computer program embodied on the computer readable storage medium can be transmitted by any suitable medium, including but not limited to wire, fiber optic cable, RF (radio frequency), etc., or any suitable combination of the foregoing. The computer readable storage medium can be included in any device; it can also be present separately and not incorporated into the device.

In addition, according to the example embodiments, an SSD is provided, the SSD includes a memory cell; a control chip, or alternatively, a processor, configured to acquire an optimization target and workload metric data that is pre-collected for a preset, or alternatively, desired, time period; select a machine learning model and a training data strategy according to the optimization target; select feature data from the workload metric data for the preset, or alternatively, desired, time period according to the selected training data strategy, and train the selected machine learning model based on the selected feature data; determine, in each subsequent predicting time, a strategy for data placement for a predicting time period corresponding to the predicting time according to the workload metric data for the preset, or alternatively, desired, time period and the workload metric data that is collected in the predicting time by using the trained machine learning model.

The device for determining a strategy for data placement within an SSD according to the example embodiments has been described above with reference to FIG. 4. Hereinafter, a computing device according to the example embodiments will be described with reference to FIG. 5.

Figure 5:
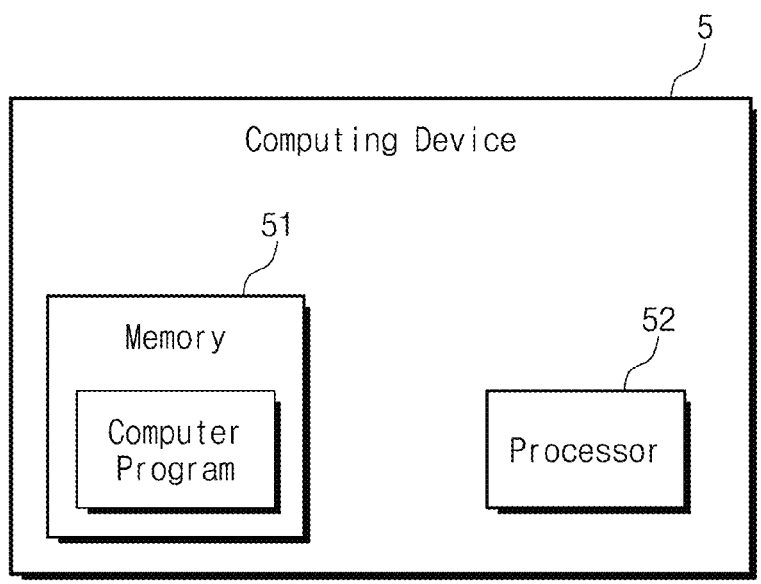
FIG. 5 illustrates a schematic diagram of a computing device, according to an example embodiment of the present disclosure.

FIG. 5 illustrates a schematic diagram of a computing device, according to an example embodiment.

Referring to FIG. 5, a computing device 5 according to some example embodiments includes a memory 51 and/or a processor 52, and a computer program is stored on the memory 51, wherein when the computer program is executed by the processor 52, the method for determining a strategy for data placement within an SSD according to the present disclosure is implemented.

In some example embodiments, when the computer program is executed by a processor 52, the follow operations may be implemented, acquiring an optimization target and workload metric data that is pre-collected for a preset, or alternatively, desired, time period; selecting a machine learning model and a training data strategy according to the optimization target; selecting feature data from the workload metric data for the preset, or alternatively, desired, time period according to the selected training data strategy, and training the selected machine learning model based on the selected feature data; and determining, in each subsequent predicting time, a strategy for data placement for a predicting time period corresponding to the predicting time according to the workload metric data for the preset, or alternatively, desired, time period and the workload metric data that is collected in the predicting time by using the trained machine learning model.

The computing device 5 may be implemented in processing circuitry, such as a hardware/software combination as shown in FIG. 5, or in hardware such as logic circuits and the like, or a combination thereof. For example, the computing device 5 more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The computing device 5 in example embodiments may include, but is not limited to, devices such as memory devices (such as SSDs), mobile phones, notebook computers, Personal Digital Assistants (PDAs), tablet PCs (PADs), desktop computers, and the like. The computing device 5 illustrated in FIG. 5 is merely an example and should not impose any limitation on the function and scope of use of the embodiments.

The method and device for determining a strategy for data placement within an SSD according to some example embodiments have been described above with reference to FIGS. 3-5. However, it should be understood that the device for determining the strategy for data placement within the SSD and units therein shown in FIG. 4 may be implemented in any suitable hardware, hardware and software, hardware firmware, etc., or combination thereof for performing a specific function or any combination thereof. The computing device 5 as shown in FIG. 5 is not limited to include the components shown above, but some components may be added or deleted as needed, and the above components may also be combined.

The method and device for determining a strategy for data placement within an SSD according to the example embodiments enables the SSD to optimize performance in a variety of workload environments by acquiring an optimization target and workload metric data that is pre-collected for a preset, or alternatively, desired, time period; selecting a machine learning model and a training data strategy according to the optimization target; selecting feature data from the workload metric data for the preset, or alternatively, desired, time period according to the selected training data strategy, and training the selected machine learning model based on the selected feature data; and determining, in each subsequent predicting time, a strategy for data placement for a predicting time period corresponding to the predicting time according to the workload metric data for the preset, or alternatively, desired, time period and the workload metric data that is collected in the predicting time by using the trained machine learning model, thereby implementing the dynamic determination of the strategy for data placement and improving the accuracy of the strategy for data placement.

While the present disclosure has been shown and described with reference to certain example embodiments thereof, it should be understood by those skilled in the art that various changes in form and details may be made therein without departing from the principle and spirit which are defined by the appended claims.

The invention claimed is:

1. A method for determining a strategy for data placement within a Solid State Drive (SSD), comprising:
acquiring an optimization target and a first workload metric data that is pre-collected for a time period;
selecting a machine learning model and a training data strategy according to the optimization target;
selecting a feature data from the first workload metric data according to the selected training data strategy, and training the selected machine learning model based on the selected feature data; and
determining, in each subsequent predicting time, a strategy for data placement for a predicting time period corresponding to the predicting time according to the first workload metric data for the time period and a second workload metric data that is collected in the predicting time by using the trained machine learning model,
wherein the determining the strategy for the data placement in the predicting time period corresponding to the predicting time comprises:
predicting an IO pattern according to the first workload metric data for the time period and a third workload metric data that is collected in a current predicting time by using the trained machine learning model;
determining the strategy for the data placement in the predicting time period corresponding to the current predicting time according to the predicted IO pattern,
wherein a type of the IO pattern comprises at least a read-intensive IO pattern, a write-intensive IO pattern, a data-hotness-degree IO pattern, a sequential-write IO pattern, and a random-write IO pattern,
wherein the determining the strategy for the data placement in the predicting time period corresponding to the current predicting time according to the predicted IO pattern comprises:
determining to use a Round-Robin strategy as the strategy for the data placement, based on the predicted IO pattern being the read-intensive IO pattern;
determining to use a strip strategy as the strategy for the data placement, based on the predicted IO pattern being the write-intensive IO pattern;
determining to use a strategy that performs partition storage for hot and cold data, based on the predicted IO pattern being the data-hotness-degree IO pattern;
adopting a strategy of writing data into a low cost flash memory unit, based on the predicted IO pattern being the sequential-write IO pattern; and
adopting a strategy of writing data into a high speed flash memory cell, based on the predicted IO pattern being the random-write IO pattern.

2. The method of claim 1, wherein the optimization target comprises at least one of write performance, NAND flash life, or read latency.

3. The method of claim 2, wherein the selecting the machine learning model and the training data strategy according to the optimization target comprises:
selecting the training data strategy for write performance optimization based on the optimization target being the write performance, wherein, according to the training data strategy for write performance optimization, at least one of IO size, IO count, IO access interval, or write amplification factor is selected as the feature data for training from the first workload metric data;
selecting the training data strategy for NAND flash life optimization based on the optimization target being the NAND flash life, wherein, according to the training data strategy for NAND flash life optimization, at least a block erasure count is selected as the feature data for training from the first workload metric data; and
selecting the training data strategy for read latency optimization based on the optimization target being the read latency, wherein, according to the training data strategy for read latency optimization, at least one of IO size, IO count, or read latency is selected as the feature data for training from the first workload metric data.

4. The method of claim 1, further comprising:
updating the time period and acquiring a third workload metric data for the updated time period, based on a change of the optimization target being detected;
re-selecting the machine learning model and the training data strategy according to the changed optimization target; and
re-selecting the feature data from the third workload metric data for the updated time period according to the re-selected training data strategy, to re-train the re-selected machine learning mode, so as to determine the strategy for the data placement by using the re-trained machine learning mode in each subsequent predicting time.

5. A non-transitory computer readable storage medium stored with a computer program, based on the computer program being executed by a processor, the method for determining a strategy for data placement within SSD of claim 1 is implemented.

6. A computing device, comprising:
a processor;
a memory stored with a computer program, and based on the computer program being executed by the processor, the method for determining a strategy for data placement within SSD of claim 1 is implemented.

7. The method of claim 1, wherein
the Round-Robin strategy includes processing write requests in turn, such that data of one write request is put into a first channel, and data of a next write request is put into a second channel,
the strip strategy includes dividing write request data into a plurality of pages, and writing the plurality of pages to a plurality of channels in parallel, and
the strategy that performs partition storage for hot and cold data includes placing hot data is a first physical block, and cold data in a second physical block.

8. A device for determining a strategy for data placement within an SSD, comprising:
a processor configured to
acquire an optimization target and a first workload metric data that is pre-collected for a time period;
select a machine learning model and a training data strategy according to the optimization target;
select feature data from the first workload metric data for the time period according to the selected training data strategy, and train the selected machine learning model based on the selected feature data;
determine in each subsequent predicting time, a strategy for data placement for a predicting time period corresponding to the predicting time according to the first workload metric data for the time period and a second workload metric data that is collected in the predicting time by using the trained machine learning mode;
predict an IO pattern according to the first workload metric data for the time period and a third workload metric data that is collected in a current predicting time by using the trained machine learning model, wherein a type of the IO pattern includes at least a read-intensive IO pattern, a write-intensive IO pattern, a data-hotness-degree IO pattern, a sequential-write IO pattern, and a random-write IO pattern;
determine the strategy for the data placement in the predicting time period corresponding to the current predicting time according to the predicted IO pattern,
determine to use a Round-Robin strategy as the strategy for the data placement, based on the predicted JO pattern being the read-intensive IO pattern;
determine to use a strip strategy as the strategy for the data placement, based on the predicted IO pattern being the write-intensive IO pattern;
determine to use a strategy that performs partition storage for hot and cold data, based on the predicted IO pattern being the data-hotness-degree IO pattern;
adopt a strategy of writing data into a low cost flash memory unit, based on the predicted IO pattern being the sequential-write IO pattern;
adopt a strategy of writing data into a high speed flash memory cell, based on the predicted IO pattern being the random-write IO pattern.

9. The device of claim 8, wherein the optimization target includes at least one of write performance, NAND flash life, or read latency.

10. The device of claim 9, wherein the processor is further configured to:
select the training data strategy for write performance optimization based on a optimization target being the write performance, wherein the training data strategy for write performance optimization includes selecting at least one of IO size, IO count, IO access interval, and write amplification factor as the feature data for training from the first workload metric data;
select the training data strategy for NAND flash life optimization based on the optimization target being the NAND flash life, wherein the training data strategy for NAND flash life optimization includes selecting at least a block erasure count as the feature data for training from the first workload metric data; and
select the training data strategy for read latency optimization based on the optimization target being the read latency, wherein the training data strategy for read latency optimization includes selecting at least one of the IO size, the IO count, and read latency as the feature data for training from the first workload metric data.

11. The device of claim 8, wherein the processor is further configured to:
update the time period and acquiring a third workload metric data for the updated time period, based on a change of the optimization target being detected;
re-select the machine learning model and the training data strategy according to the changed optimization target;
re-select the feature data from the third workload metric data for the updated time period according to the re-selected training data strategy; and
re-train the re-selected machine learning mode, so as to determine the strategy for the data placement by using the re-trained machine learning mode in each subsequent predicting time.

12. The device of claim 8, wherein
the Round-Robin strategy includes processing write requests in turn, such that data of one write request is put into a first channel, and data of a next write request is put into a second channel,
the strip strategy includes dividing write request data into a plurality of pages, and writing the plurality of pages to a plurality of channels in parallel, and
the strategy that performs partition storage for hot and cold data includes placing hot data is a first physical block, and cold data in a second physical block.

13. A Solid State Drive (SSD), comprising:
a memory cell storing computer-readable instructions;
a processor configured to execute the computer-readable instructions to
acquire an optimization target and a first workload metric data that is pre-collected for a time period;
select a machine learning model and a training data strategy according to the optimization target;
select feature data from the first workload metric data for the time period according to the selected training data strategy, and training the selected machine learning model based on the selected feature data;
determine, in a plurality of subsequent predicting time periods, a strategy for data placement for a one of the plurality of subsequent predicting time periods according to the first workload metric data for the time period and a second workload metric data that is collected in the one of the plurality of subsequent predicting time periods by using the trained machine learning model;

predict an IO pattern according to the first workload metric data for the time period and a third workload metric data that is collected in a current predicting time by using the trained machine learning model, wherein a type of the IO pattern includes at least a read-intensive IO pattern, a write-intensive IO pattern, a data-hotness-degree IO pattern, a sequential-write IO pattern, and a random-write IO pattern;

determine the strategy for the data placement in the predicting time period corresponding to the current predicting time according to the predicted IO pattern, determine to use a Round-Robin strategy as the strategy for the data placement, based on the predicted IO pattern being the read-intensive IO pattern;

determine to use a strip strategy as the strategy for the data placement, based on the predicted IO pattern being the write-intensive IO pattern;

determine to use a strategy that performs partition storage for hot and cold data, based on the predicted IO pattern being the data-hotness-degree IO pattern;

adopt a strategy of writing data into a low cost flash memory unit, based on the predicted IO pattern being the sequential-write IO pattern;

adopt a strategy of writing data into a high speed flash memory cell, based on the predicted IO pattern being the random-write IO pattern.

14. The SSD of claim 13, wherein the processor is further configured to write data based on the determined strategy for data placement.

\* \* \* \* \*